Patented Dec. 9, 1941

2,265,364

UNITED STATES PATENT OFFICE 2,265,364

ARTIFICIAL DISPERSION OF RUBBER

Donald E. Fowler, Naugatuck, and Joseph F. Zemaitis, Waterbury, Conn., assignors, by mesne assignments, to Dispersions Process, Inc., New York, N. Y., a corporation of Delaware No Drawing. Application July 15, 1939, Serial No. 284,708

4 Claims. (Cl. 260—760)

This invention relates to artificial dispersions of rubber, and more particularly artificial dispersions of rubber which on drying leave essentially no water soluble or water absorptive residue from the dispersing agent.

Artificial dispersions of crude and reclaimed rubbers are commonly made by milling the rubber into a plasticized condition, transferring the plasticized stock to an internal mixer, such as a Werner & Pfleiderer mixer, and adding a hydrophilic colloid to the mass and water until an inversion of phase takes place and the rubber ceases to be the continuous phase and becomes dispersed in the aqueous medium. Three types of hydrophilic colloids are commonly used today to make such dispersions, namely, colloidal clays, proteins, and soaps. Dried films obtained from dispersions of rubber on colloidal clays, proteinates, and soaps such as alkali, methylamine, or diethanolamine soaps contain water soluble or water absorptive residues from the dispersing agent. While ammonium soaps as dispersing agents may give a dispersion from which the ammonia will be volatilized on drying of the film and leave an insoluble fatty acid, such dispersions are unsatisfactory because of the instability particularly in the presence of zinc oxide, due to the formation of destabilizing zinc ammonium complex ions in the dispersion.

The present invention relates to the production of artificial dispersions of rubber which on drying leave a rubber film free from water soluble or water absorptive residues of the dispersing agents used to disperse the rubber, and which are stable in the presence of zinc oxide.

According to the present invention, rubber, which may be either crude or reclaimed rubber, or mixtures of rubber with non-rubber materials such as wax, are dispersed with water in the usual way by means of a morpholine soap. The morpholine soap is preferably used as a dispersing agent in an amount equivalent to about 5 to 15 parts by weight of the soap per 100 parts of rubber, or rubber and other material to be dispersed, although less of the morpholine soap may be used in some cases and a greater amount does no damage to the dispersion. Any morpholine soap of the common soap-forming acids may be used, such as morpholine stearate, morpholine oleate, morpholine linoleate, morpholine soaps of resins, morpholine riconoleate, morpholine palmitate, morpholine laurate, and the like. Artificial rubbers and rubber-like materials, such as polymerized butadiene, Thiokol which is an olefin polysulphide plastic, Neoprene which is a chloro-2-butadiene, 1-3 polymer, Buna which is a copolymer of butadiene and acrylic nitrile, as well as crude and reclaimed rubber, may be dispersed on morpholine soaps according to the present invention. Such aqueous dispersions of artificial rubbers and rubber-like materials are equivalent to aqueous dispersions of crude and reclaimed rubbers in the present invention.

In dispersing the rubber or mixtures of the rubber and non-rubber materials, such as wax, oils, softeners and the like, on morpholine soaps, the soap may be formed in situ by the separate addition to the plasticized stock of the soap forming acid and the morpholine, or the soap may be previously prepared and added as such to the plasticized mass. In separately preparing the morpholine soap, for example, morpholine stearate, the stearic acid may be first melted and the morpholine diluted with water stirred into the melted stearic acid, the soap forming immediately.

As an example of carrying out the invention, 100 parts by weight of crude rubber (smoked sheet) was plasticized in an open rubber mill until soft and easily workable, and was then transferred to an internal dough mixer (Werner & Pfleiderer), where six parts by weight of stearic acid were added and thoroughly worked in. A little water was slowly worked in with the batch until the material in the mixer contained about 6% water, after which two parts by weight of morpholine was added to form the morpholine stearate in situ. Additional water was then slowly added until a change in phase took plate and the rubber became dispersed in the water, after which it could be diluted to any desired consistency.

As an example of the preparation of artificial dispersions of rubber and wax, 100 parts by weight of rubber (pale crepe) was plasticized on the mill and transferred to an internal dough mixer, Werner & Pfleiderer. 100 parts by weight of paraffine wax and 16 parts of stearic acid were added to the plasticized rubber in the dough mixer, after which a small amount of water was added, and then 6 parts by weight of morpholine to form morpholine stearate in situ. Additional water was then slowly added until a change in phase took place, after which the dispersion could be diluted to any desired consistency.

Zinc oxide, as well as other compounding ingredients, such as sulphur, accelerators, antioxidants, and filler materials, may readily be incorporated into these rubber and rubber and wax dispersions without destabilizing them. On deposition of rubber from these dispersions and drying of the rubber deposit, the morpholine soap decomposes and leaves no water-soluble or water absorbent material in the film. These dispersions may be used as such or mixed with natural rubber latices in various processes where it is desired to have the rubber in the form of a dispersion in an aqueous medium.

In view of the many changes and modifications that may be made without departing from the principles underlying the invention, reference should be made to the appended claims for an understanding of the scope of the invention.

Having thus described our invention, what we claim and desire to protect by Letters Patent is:

1. A composition stable in the presence of zinc oxide comprising an artificial dispersion of rubber particles in an aqueous medium, said composition containing a morpholine soap.

2. A composition comprising a stable artificial dispersion of rubber particles in an aqueous medium, said composition containing zinc oxide and a morpholine soap.

3. A composition stable in the presence of zinc oxide comprising an artificial dispersion of rubber particles in an aqueous medium, said composition containing 5 to 15 parts by weight of a morpholine soap per 100 parts of rubber.

4. A composition comprising a stable artificial dispersion of rubber particles in an aqueous medium, said composition containing zinc oxide and 5 to 15 parts by weight of a morpholine soap per 100 parts of rubber.

DONALD E. FOWLER.
JOSEPH F. ZEMAITIS.